Patented Jan. 8, 1952

2,581,924

UNITED STATES PATENT OFFICE 2,581,924

STABILIZATION OF RUBBERS

George E. P. Smith, Jr. and Harry E. Albert, Akron, Ohio, assignors to The Firestone Tire & Rubber Company, Akron, Ohio, a corporation of Ohio No Drawing. Application January 10, 1948, Serial No. 1,673

19 Claims. (Cl. 260—45.75)

This invention relates to the stabilization of rubbers, both natural rubber and rubbery copolymers of a vinyl monomer and a conjugated-diene monomer. The rubbery copolymer of 1,3-butadiene and styrene known as GR–S is representative of such a copolymer. The rubbery copolymer of 1,3-butadiene and acrylonitrile also belongs to the general class. The copolymers which may be stabilized according to this invention include the rubbery copolymers of a conjugated-diene monomer—for example, 1,3-butadiene, isoprene, 2-cyanobutadiene-1,3, cyclopentadiene, piperylene, dimethyl butadiene-1,3, 2-methyl-1, 3-pentadiene, etc.—and a vinyl monomer—for example, aromatic monomers such as styrene, alpha methyl styrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, etc., and aliphatic monomers such as monomers having the formula $CH_2:C(R)$—$X$ when R is hydrogen, methyl, ethyl, propyl or chlorine, and X is —COOR', —COR' or —CONH$_2$ when R' is an alkyl group of one to five carbon atoms. More particularly, the invention relates to the stabilization of natural rubber and the rubbery copolymer of 1,3-butadiene and styrene known as GR–S. The invention includes the process of stabilization as well as the stabilized products.

The stabilizers employed are stannous salts of alicyclic carboxylic acids, as, for example, stannous salts of various naphthenic acids, stannous rosinate, stannous hydrorosinate, stannous dehydrogenated rosinate, and stannous salts of cyclohexane carboxylic acid, dicyclohexane carboxylic acids, decahydronaphthalene carboxylic acids, dicyclobutane carboxylic acids, cyclohexene carboxylic acids, and cyclopentane carboxylic acids.

Naphthenic acids are obtained from petroleum by washing with alkali. They consist principally of mono- and di-cyclic reduced rings (cyclopentane mostly, but some cyclohexane and cyclobutane) with numerous aliphatic side chains and with acid groups attached either to the ring or to a side chain. Only a very few of these acids have been positively identified. However, the acid mixture and its neutralization equivalent are commonly known and used and can be identified from the above information. There are at least two naphthenic acids on the market: one advertised as having a neutralization equivalent range of 210–220 and molecular weight of 255–267, and the other advertised as having a neutralization equivalent range of 230–245 and molecular weight of 229 to 244.

The stabilizers commonly recommended for the stabilization of GR–S, such as phenyl-beta-naphthylamine, etc. discolor badly on aging. The stannous salts of this invention give good stabilization of GR–S and other synthetics without appreciable discoloration. Ordinarily, the stabilizer of this invention when used with a synthetic will be added to the copolymer latex before coagulation, but it can be compounded with the copolymer by milling or in any other manner. When used with natural rubber, it will be employed in any usual manner. By adding it to the latex of a synthetic, the copolymer is stabilized during the drying of the coagulum as well as in subsequent treatments and storage. The amount of the stabilizer employed will vary, 2 percent being a common amount, although from 0.1 to 10 percent more or less, may be used.

The coagulum for the tests on synthetics was obtained by coagulation of copolymer with aluminum sulfate, coagulant low in iron being used for the light-colored stocks. The following table refers to the results obtained on mixing 2 per cent of different stabilizers with a latex obtained by emulsion copolymerization of 1,3-butadiene and styrene, coagulating, drying and heat-aging the coagulum. The stabilizers tested included phenyl-beta-naphthylamine which was used as a control. Experience has shown that copolymer similarly compounded, except that it contained no stabilizer, would harden and resinify if dried or hardened in the manner the test materials were treated, as described in Tables I and II. In these tables the first column of each of the recorded results gives the plasticity as determined in an extrusion plastometer of the type described in J. H. Dillon et al. U. S. Patent 2,045,548 known generally as a Firestone Extrusion Plastometer, the figure given being the number of minutes required to extrude a constant volume of rubber through a given opening by the action of a piston activated by a constant pressure of 4¼ pounds' steam at a constant temperature of 185° F. Following the plasticity figure, the color of the test material is recorded, and then the results of a hand test are recorded. This hand test consisted of pulling and feeling the copolymer sample to detect any stiffening, softening or other signs of deterioration.

TABLE I
Copolymer aging

| Stabilizer | After Drying 20 Hours at 75° C. | | | Heat-Aging at 90° C. | | | | | |
|---|---|---|---|---|---|---|---|---|---|
| | | | | Two Days | | | Four Days | | |
| | T-4¼ | Color | Hand Test | T-4¼ | Color | Hand Test | T-4¼ | Color | Hand Test |
| 2% stannous rosinate | 4.0 | Light yellow | No deterioration | 10.6 | Light yellow | No change | 29.8 | Light yellow | No change. |
| 2% stannous naphthenate | 5.0 | White | do | 10.8 | Light cream | do | 31.4 | Light cream | Do. |
| 2% phenyl-beta-naphthylamine | 7.0 | Brown | do | 8.2 | Brown | do | 42.4 | Brown | Do. |

The above data show that the stannous rosinate and stannous naphthenate stabilize the copolymer as well as phenyl-beta-naphthylamine under the test conditions. The color advantage for the stannous salts is quite obvious.

The next table records the results of using a different stabilizer in the same copolymer against the same control under the same conditions with comparable results.

TABLE II
Copolymer aging

| Stabilizer | After Drying 20 Hours at 75° C. | | | Heat-Aging at 90° C. | | | | | |
|---|---|---|---|---|---|---|---|---|---|
| | | | | Two Days | | | Four Days | | |
| | T-4¼ | Color | Hand Test | Color | Hand Test | T-4¼ | Color | Hand Test | |
| 2% stannous hydrorosinate | 5.6 | White | No deterioration | Cream | No change | 10.2 | Very light brown | No change. | |
| 2% phenyl-betanaphthylamine | 5.6 | Brown | do | Brown | do | 5.2 | Brown | Do. | |

The new stabilizer is equivalent to the control in stabilization and discolors less.

Copolymer of styrene and 1,3-butadiene to which 2 parts per 100 of a stabilizer of this invention was added while in latex form, was coagulated with crude aluminum sulfate, dried, and then compounded according to the following formula. A blank containing the same amount of phenyl-beta-naphthylamine was similarly compounded. The compounds were cured at 40, 60, 80 and 120 minutes at 280° F. Aged samples were obtained by heating four days in an oven at 100° C. The average of physical tests conducted on samples so cured are recorded in Table III. The material was compounded according to the following formula:

FORMULA I

| | |
|---|---|
| Copolymer containing 2 parts stabilizer | 100.00 |
| Coal-tar-oil softener | 3.00 |
| Pine tar | 3.00 |
| Stearic acid | 3.00 |
| Zinc oxide | 5.00 |
| Accelerator | 1.20 |
| Channel black | 50.00 |
| Sulfur | 2.00 |

The accelerator used was N-cyclohexylbenzothiazyl sulfenamide.

In the tables of physical properties herein, the modulus and tensile strength are given in pounds per square inch.

TABLE III
Copolymer aging

| Stabilizer | 200% Modulus | | | Tensile | | | Elongation | | |
|---|---|---|---|---|---|---|---|---|---|
| | Normal | Aged | Per Cent of Normal | Normal | Aged | Per Cent of Normal | Normal | Aged | Per Cent of Normal |
| stannous hydro-rosinate | 275 | 1,010 | 367 | 2,600 | 2,730 | 105 | 780 | 425 | 54 |
| phenyl-beta-naphthylamine | 295 | 1,190 | 403 | 2,740 | 2,640 | 96 | 735 | 385 | 52 |

The aging was carried out for four days in an oven at 212° F. Compared to the control, the stannous hydrorosinate has the following advantages:

1. Less per cent increase in modulus on aging.
2. Better tensile retention on aging.
3. Slightly better elongation retention on aging.

Copolymer of 1,3-butadiene and styrene containing 2 parts per 100 of a stabilizer of this invention, obtained as above, was compounded according to the following formula in stock suitable for use in white sidewalls and then tested against stock similarly prepared but stabilized with a widely used commercial stabilizer identified herein as stabilizer No. 1.

FORMULA 2

| | |
|---|---|
| Copolymer containing 2 parts stabilizer | 100.00 |
| Stearic acid | 1.00 |
| Paraffin wax | 0.50 |
| Finely divided calcium carbonate | 50.00 |
| Zinc oxide | 5.00 |
| Titanium dioxide | 8.00 |
| Sunproof wax | 1.80 |
| Green dye | 2.00 |
| Coumarone resin | 2.50 |
| Accelerators | 1.40 |
| Sulfur | 1.50 |

The accelerators used were 1.3 parts N-cyclohexylbenzothiazyl sulfenamide and 0.1 part tetramethylthiuram disulfide. The compounded stocks were cured 30 and 60 minutes at 280° F. and tested in a Fadeometer, the test being conducted for 24 hours at 125° F. The samples containing the control were light brown; whereas the samples similarly compounded and similarly tested but containing stannous naphthenate instead of the commercial stabilier were only slightly discolored.

The above is illustrative of the use of the stabilizers of this invention in the rubbery copolymers of a conjugated-diene monomer and an aromatic or aliphatic vinyl monomer. The stabilizers are useful in natural rubber also. Being non-discoloring they may be used as antioxidants in white-sidewall-tire stock.

Natural rubber was compounded according to the following formula:

FORMULA 3

| | Parts by weight |
|---|---|
| Pale crepe | 100.00 |
| Zinc oxide | 85.00 |
| Titanium dioxide | 10.00 |
| Stearic acid | 1.20 |
| Ultramarine blue | 0.20 |
| Sunproof wax | 2.00 |
| Insoluble sulfur | 3.00 |
| Dibutyl ammonium oleate | 0.50 |
| Benzothiazyl disulfide | 0.40 |

This was used as the control. To a portion of it was added 1 per cent (based on the rubber) of stannous naphthenate. The stocks were cured 20, 40, 60 and 80 minutes at 280° F. The stocks were aged (1) 3 hours in an air bomb at 260° F.; (2) in an oxygen bomb for 96 hours at 158° F.; and (3) 2 days in an oven at 212° F. In the following table the properties of the samples before and after these three types of aging are listed, and the values given are averages for the values obtained on the stocks subjected to different cures:

TABLE IV

*Natural rubber-aging*

| | Normal Properties | | Aged Samples | | | | | |
|---|---|---|---|---|---|---|---|---|
| | | | Air Bomb | | Oxygen Bomb | | Oven | |
| | Control | Test | Control | Test | Control | Test | Control | Test |
| Modulus: | | | | | | | | |
| at 400% | 980 | 800 | 550 | 550 | 1,075 | 900 | 975 | 975 |
| at 500% | 1,900 | 1,625 | 940 | 900 | 1,825 | 1,625 | 1,725 | 1,825 |
| Tensile strength | 3,050 | 3,075 | 1,000 | 1,075 | 1,775 | 2,125 | 1,800 | 1,950 |
| Elongation | 600 | 620 | 515 | 535 | 460 | 430 | 510 | 520 |

In flexing tests the test material gave an overall improvement over the control of some 30 to 40 per cent. Stannous naphthenate is a flex-fatigue resistor. In a weatherometer test, the test material was somewhat superior to the control.

Thus, the stabilizers are stabilizers in both natural rubber and rubbery copolymers.

Although commercially stannous salts of a mixture of naphthenic acids, or the stannous salt of one or more of the rosin acids (stannous rosinate, stannous hydrorosinate and stannous dehydrogenated rosinate) will ordinarily be employed, it is to be understood that the invention is not limited thereto but includes the use of one or more of the stannous salts of the alicyclic carboxylic acids, including the terpene carboxylic acids. The examples are only illustrative, the invention being defined by the appended claims.

What we claim is:

1. A rubber material of the class consisting of natural rubber and rubbery copolymers of conjugated-diene monomer and vinyl monomer, which contains a stabilizing amount of the stannous salt of an alicyclic carboxylic acid.

2. Rubbery copolymer of a conjugated-diene monomer and a vinyl aromatic monomer stabilized with a small amount of the stannous salt of an alicyclic carboxylic acid.

3. Latex of rubbery copolymer of a conjugated-diene monomer and a vinyl monomer stabilized with a small amount of a stanonus salt of an alicyclic carboxylic acid.

4. Coagulum from latex of rubbery copolymer of a conjugated-diene monomer and a vinyl aromatic monomer stabilized with a small amount of stannous salts of a mixture of naphthenic acids.

5. Coagulum from latex of rubbery copolymer of conjugated-diene monomer and a vinyl aromatic monomer stabilized with a small amount of the stannous salt of a rosin acid.

6. Cured, rubbery copolymer of conjugated-diene monomer and a vinyl monomer stabilized with a small amount of the stannous salt of an alicyclic carboxylic acid.

7. Cured, rubbery copolymer of conjugated-diene monomer and a vinyl monomer stabilized with a small amount of stannous salt of a naphthenic acid.

8. Cured, rubbery copolymer of conjugated-diene monomer and a vinyl aromatic monomer stabilized with a small amount of the stannous salt of a rosin acid.

9. Cured, rubbery copolymer of 1,3-butadiene and styrene stabilized with a small amount of stannous salts of a mixture of naphthenic acids.

10. Cured, rubbery copolymer of 1,3-butadiene and styrene stabilized with a small amount of the stannous salt of a rosin acid.

11. The method of obtaining latex coagulum which comprises adding to latex of rubbery copolymer of conjugated-diene monomer and a vinyl monomer, a stabilizing amount of the stannous salt of an alicyclic carboxylic acid, coagulating, and drying.

12. The method of obtaining uncured copolymer of 1,3-butadiene and styrene which comprises adding to latex of such rubbery copolymer a stabilizing amount of stannous salts of a mixture of naphthenic acids, coagulating with aluminum sulfate, and then drying.

13. The method of drying the coagulum of rubbery copolymer of 1,3-butadiene and styrene which comprises heating the same in admixture with a stabilizing amount of the stannous salt of an alicyclic carboxylic acid.

14. The method of producing cured, rubbery copolymer of conjugated-diene monomer and vinyl monomer which comprises curing the copolymer with sulfur in the presence of a small amount of a stabilizer which is the stannous salt of an alicyclic carboxylic acid.

15. The method of curing rubbery copolymer of 1,3-butadiene and styrene which comprises vulcanizing the copolymer with sulfur in the presence of a small amount of stannous salts of a mixture of naphthenic acids as a stabilizer.

16. Cured natural rubber stabilized with a small amount of the stannous salt of an alicyclic carboxylic acid.

17. Cured natural rubber stabilized with a small amount of stannous naphthenate.

18. The method of curing natural rubber which comprises vulcanizing the same with sulfur in the presence of a small amount of stannous salt of alicyclic carboxylic acid as a stabilizer.

19. A rubbery material of the class consisting of natural rubber and rubbery copolymers of conjugated-diene monomer and vinyl monomer, loaded with light-colored pigment and stabilized with a small amount of the stanous salt of an alicyclic carboxylic acid.

GEORGE E. P. SMITH, JR.
HARRY E. ALBERT.

REFERENCES CITED

The following references are of record in the file of this patent:

UNITED STATES PATENTS

| Number | Name | Date |
|---|---|---|
| 2,182,528 | Stamatoff | Dec. 5, 1939 |
| 2,307,092 | Yngve | Jan. 5, 1943 |
| 2,476,833 | Albert | July 19, 1949 |

FOREIGN PATENTS

| Number | Country | Date |
|---|---|---|
| 579,238 | Great Britain | July 29, 1946 |